US008577296B2

(12) United States Patent
Eldering

(10) Patent No.: US 8,577,296 B2
(45) Date of Patent: Nov. 5, 2013

(54) WEIGHTING FACTOR ADJUSTMENT IN ADAPTIVE ANTENNA ARRAYS

(75) Inventor: Charles A. Eldering, Furlong, PA (US)

(73) Assignee: Empire Technology Development, LLC, Wilmington, DE (US)

( * ) Notice: Subject to any disclaimer, the term of this patent is extended or adjusted under 35 U.S.C. 154(b) by 1019 days.

(21) Appl. No.: 12/201,415

(22) Filed: Aug. 29, 2008

(65) Prior Publication Data

US 2010/0056191 A1 Mar. 4, 2010

(51) Int. Cl.
*H04B 1/00* (2006.01)
*H04B 15/00* (2006.01)
*H04B 17/00* (2006.01)
*H04B 1/06* (2006.01)
*H04B 7/00* (2006.01)

(52) U.S. Cl.
USPC ... 455/63.1; 455/63.2; 455/67.11; 455/226.1; 455/276.1

(58) Field of Classification Search
USPC ............ 455/67.11, 562.1, 575.7, 272, 455/275–276.1, 69, 522, 101, 63.1–63.2, 455/63.4, 67.16, 132–135, 226.1–226.4, 455/276.1–277.2, 456.1, 456.5
See application file for complete search history.

(56) References Cited

U.S. PATENT DOCUMENTS

| 5,917,446 | A | | 6/1999 | Greenspan |
| 5,920,286 | A | * | 7/1999 | Mohebbi ...................... 342/383 |
| 5,929,811 | A | * | 7/1999 | Rilling ......................... 342/380 |
| 6,192,256 | B1 | * | 2/2001 | Whinnett .................... 455/562.1 |
| 6,362,781 | B1 | | 3/2002 | Thomas et al. |
| 6,430,421 | B1 | * | 8/2002 | Kiiski et al. ................ 455/562.1 |
| 6,463,303 | B1 | * | 10/2002 | Zhao ........................... 455/562.1 |
| 6,501,943 | B1 | * | 12/2002 | Ide et al. ....................... 455/101 |
| 6,574,460 | B1 | * | 6/2003 | Lindenmeier et al. ...... 455/277.1 |
| 6,611,231 | B2 | | 8/2003 | Crilly et al. |
| 6,690,747 | B2 | * | 2/2004 | Petrus et al. ................... 375/324 |
| 6,718,184 | B1 | * | 4/2004 | Aiken et al. ................ 455/562.1 |
| 6,735,445 | B2 | | 5/2004 | Sharony et al. |
| 6,823,174 | B1 | * | 11/2004 | Masenten et al. ............ 455/63.4 |
| 6,894,643 | B2 | * | 5/2005 | Guo et al. ...................... 342/383 |
| 6,907,245 | B2 | | 6/2005 | Ohlsson et al. |
| 6,970,682 | B2 | | 11/2005 | Crilly et al. |
| 6,993,334 | B2 | | 1/2006 | Andrus et al. |
| 7,010,055 | B2 | | 3/2006 | Harrison et al. |
| 7,099,698 | B2 | | 8/2006 | Tarokh et al. |

(Continued)

OTHER PUBLICATIONS

Smart Antennas to expand Wi-Fi Range, accessed at <http://www.computerworld.com/mobiletopics/mobile/technology/story/0,10801,88487,00.html> on Jan. 17, 2008.

(Continued)

*Primary Examiner* — Simon Nguyen
(74) *Attorney, Agent, or Firm* — Moritt Hock & Hamroff LLP; Steven S. Rubin, Esq.

(57) ABSTRACT

A method of forming an adaptive antenna array includes calculating intra-unit phase relationships between antenna elements of a plurality of access units and measuring inter-unit phase relationships between the access units. An indication of a desired coverage area collectively produced by the plurality of access units is received. A set of weighting factors is determined. Each weighting factor is associated with an individual antenna element in the plurality of access units and the set of weighting factors provide the desired coverage pattern. Phase lock between the plurality of access units is maintained to control the desired coverage pattern.

8 Claims, 8 Drawing Sheets

(56) References Cited

U.S. PATENT DOCUMENTS

| | | | |
|---|---|---|---|
| 7,103,119 B2* | 9/2006 | Matsuoka et al. | 375/347 |
| 7,103,120 B2* | 9/2006 | Shibata | 375/347 |
| 7,107,085 B2* | 9/2006 | Doi | 455/575.7 |
| 7,109,919 B2* | 9/2006 | Howell | 342/372 |
| 7,224,685 B2 | 5/2007 | Proctor, Jr. | |
| 7,272,408 B2* | 9/2007 | Dalal et al. | 455/502 |
| 7,388,540 B1 | 6/2008 | Zogg et al. | |
| 7,414,577 B2* | 8/2008 | Mohamadi | 342/372 |
| 7,420,507 B2* | 9/2008 | Thomas et al. | 342/368 |
| 7,426,198 B2* | 9/2008 | Mondal et al. | 370/329 |
| 7,496,384 B2* | 2/2009 | Seto et al. | 455/562.1 |
| 7,548,764 B2* | 6/2009 | Jin et al. | 455/562.1 |
| 7,599,714 B2 | 10/2009 | Kuzminskiy | |
| 7,835,768 B2* | 11/2010 | Crozzoli et al. | 455/562.1 |
| 7,876,268 B2* | 1/2011 | Jacobs | 342/465 |
| 8,077,111 B2* | 12/2011 | Derneryd et al. | 343/853 |
| 2001/0005685 A1 | 6/2001 | Nishimori et al. | |
| 2002/0000948 A1* | 1/2002 | Chun et al. | 343/853 |
| 2003/0013450 A1 | 1/2003 | Wang et al. | |
| 2003/0064752 A1 | 4/2003 | Adachi et al. | |
| 2004/0178907 A1 | 9/2004 | Cordoba | |
| 2004/0240410 A1* | 12/2004 | Hayashi et al. | 370/329 |
| 2005/0085270 A1* | 4/2005 | Sobczak et al. | 455/562.1 |
| 2006/0128310 A1* | 6/2006 | Leabman | 455/63.1 |
| 2006/0146754 A1 | 7/2006 | Bejerano | |
| 2006/0193373 A1* | 8/2006 | Agee et al. | 375/141 |
| 2007/0099666 A1* | 5/2007 | Astely et al. | 455/562.1 |
| 2007/0126630 A1* | 6/2007 | Coppi et al. | 342/377 |
| 2007/0147361 A1 | 6/2007 | Lee | |
| 2007/0149250 A1* | 6/2007 | Crozzoli et al. | 455/562.1 |
| 2007/0159407 A1* | 7/2007 | Bolle et al. | 343/853 |
| 2007/0197164 A1 | 8/2007 | Sheynman et al. | |
| 2008/0014941 A1 | 1/2008 | Catovic et al. | |
| 2008/0238688 A1* | 10/2008 | Rofougaran et al. | 340/572.7 |
| 2008/0261658 A1* | 10/2008 | Jin et al. | 455/562.1 |
| 2009/0225879 A1 | 9/2009 | Kloos et al. | |
| 2009/0296638 A1* | 12/2009 | Kimura et al. | 370/329 |
| 2010/0060523 A1 | 3/2010 | Yamazaki et al. | |
| 2010/0194629 A1* | 8/2010 | Craig et al. | 342/354 |

OTHER PUBLICATIONS

Bandspeed, Inc.—Product FAQs, accessed at <http://www.bandspeed.com/support/faq.php> on Oct. 2, 2008.

Bandspeed, Inc.—AirMaestro 3100AG Virtual Controller Starter Kit, accessed at <http://www.bandspeed.com/products/3100ag_kit.php> on Oct. 2, 2008.

Getting the Most out of MIMO, accessed at <http://www.atheros.com/pt/whitepapers/MIMO_WLAN_Perf_whitepaper.pdf> on Jan. 14, 2008.

UWB Signal Sources, Antennas & Propagation, accessed at <http://www.picosecond.com/objects/AN-14a.pdf> on Jan. 14, 2008.

A Brief History of UWB Antennas, accessed at <http://www.coe.montana.edu//ee/rwolff/EE548/EE548-S06/UWB/Intro_UWBAntennas.pdf> on Jan. 14, 2008.

* cited by examiner

WEIGHTING FACTOR ADJUSTMENT IN ADAPTIVE ANTENNA ARRAYS

CROSS REFERENCE TO RELATED APPLICATIONS

This application is related to co-pending U.S. patent application Ser. No. 12/201,381, filed Aug. 29, 2008, entitled Adaptive Antenna Weighting System for Wireless Local Area and Personal Area Networks, and U.S. patent application Ser. No. 12/201,403, filed Aug. 29, 2008, entitled Method and System for Adaptive Antenna Array Pairing.

BRIEF DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

In the Drawings.

DETAILED DESCRIPTION

Figure 1:
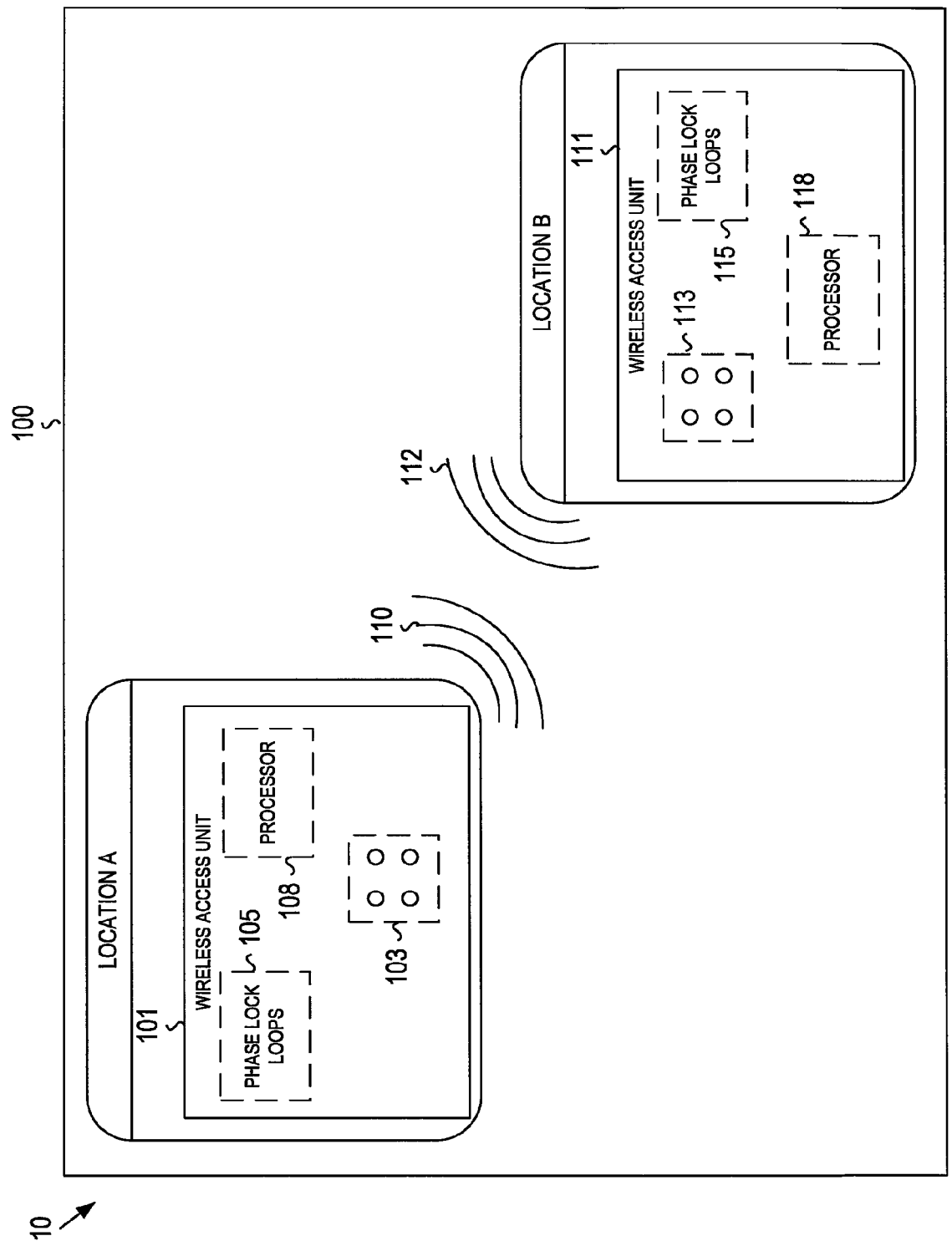
FIG. 1 is a system diagram of a multi-unit adaptive antenna array system according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments disclosed herein, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

This disclosure is drawn, inter alia, to methods, apparatus, computer programs and systems related to antenna systems. In the present disclosure, wireless access units having antenna arrays of multiple antennas or antenna elements work in conjunction with one or more other access units to maintain phase lock between the various units and to create desired radiation patterns based on antenna weighting factors determined in and among the multiple access units. By controlling phase both within and between access units, a higher degree of control over the radiation patterns can be obtained. In turn, suppression of performance impairments such as multipath, signal fading, and co-channel interference is aided. Moreover, by acting in conjunction with one another, each access unit extends its range by being able to focus its antenna gain in the regions not covered by other wireless access units. Thus, it is also be possible to reduce the required transmission power by accounting for coverage areas that overlap between several of the wireless access units.

FIG. 1 illustrates a multi-unit adaptive antenna array system 10 having multiple wireless access units 101, 111 operating cooperatively to provide wireless network coverage for an area 100 which is any environment capable of supporting wireless transmissions. Each wireless access unit 101, 111 is capable of transmitting and receiving data over a wireless connection using any one or combination of wireless communication protocols or specification generally known in the art, including, without limitation, Bluetooth, IEEE 802.11, IEEE 802.16, GPRS, EDGE, WCDMA, CDMA2000, EVDO, EVDV, and HSDPA. As shown by the transmission arcs 110, 112 in FIG. 1, the access units 101, 111 communicate with each other over a wireless transmission channel.

Via this connection, the access units 101, 111 can access a network, other computers, computer peripherals, or digital devices (not shown). The wireless access units may be coupled with mobile devices such as laptops, PDAs, mobile phones (including smart phones), video game systems, or music players (not shown). The wireless access units 101, 111 may also be included in devices that are configured to remain at a fixed location such as a building rooftop or ceiling (e.g., a wireless router). It should also be noted that, although there are only two wireless access units 101, 111 in FIG. 1, there may be many such wireless access units present in the system 10.

The wireless access units 101, 111 are located at a distinct location in the coverage area 100. Although wireless access units 101, 111 are shown in FIG. 1 at Locations A and B, respectively, the wireless access units 101, 111 may be located anywhere within the coverage area 100. Also, the type of device that forms the wireless access unit does not need to be uniform over the operating area 100. For example, referring to FIG. 1, wireless access unit 101 may be a communications tower mounted on an office building, while wireless access unit 111 may form part of or be coupled with a smart phone.

Figure 2:
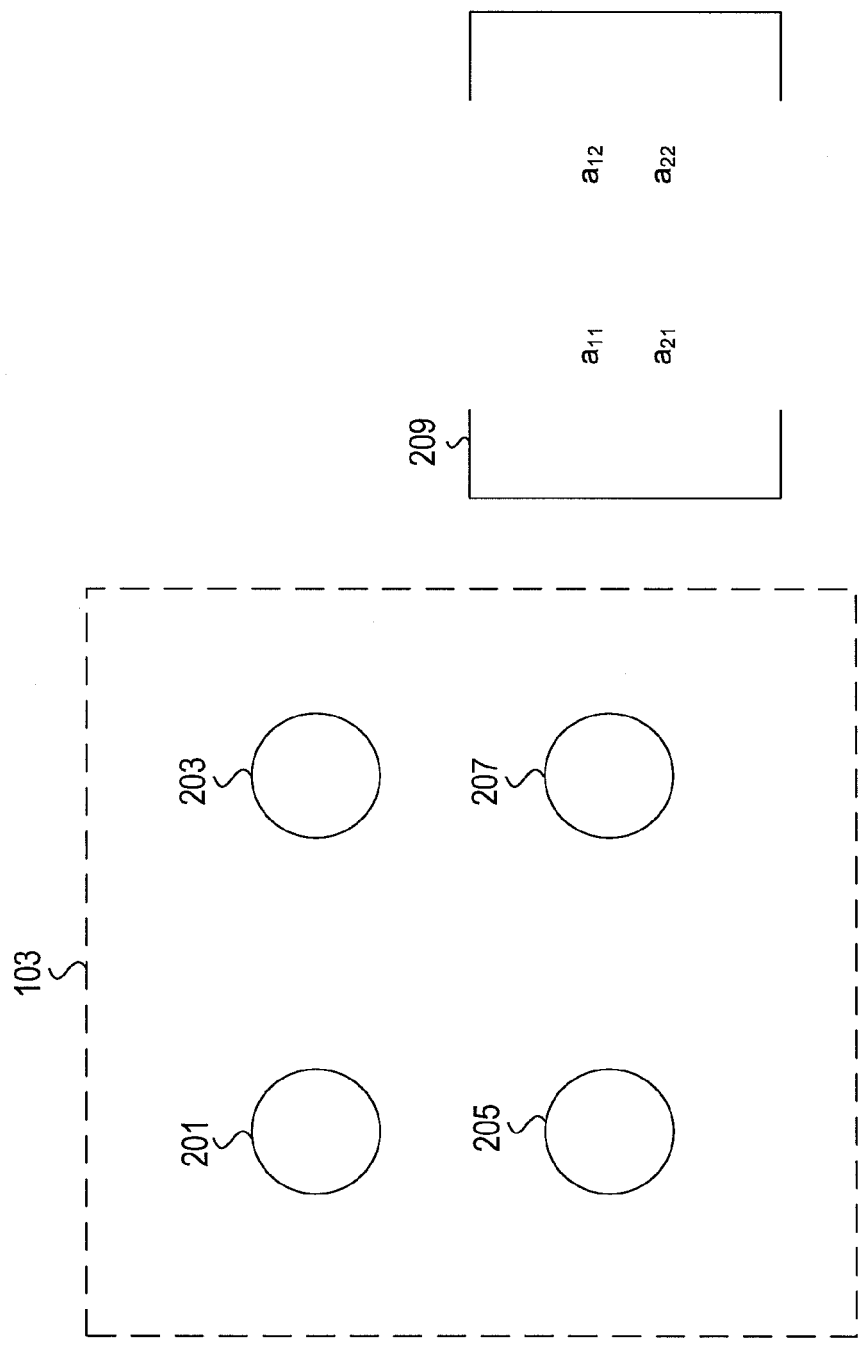
FIG. 2 is a system diagram of a multi-unit adaptive array and an associated weighting matrix in accordance with the adaptive antenna array system of FIG. 1.

The wireless access units 101, 111 include one or more adaptive antenna arrays 103, 113, respectively, formed from a plurality of antenna elements. In the embodiment of FIG. 1, each wireless access unit 101, 111 includes an adaptive array of four monopole antenna elements arranged in a 2×2 configuration. The antenna arrays are not limited to monopole antenna elements, but can be configured any number of ways with different types of antennas or antenna elements generally known in the art, such as dipole, patch, or horn configurations. Also, the antenna elements of the antenna arrays 103, 113 need not be arranged in a 2×2 configuration as shown in FIG. 1; rather, any m×n array configuration is acceptable if it produces a desired radiation pattern. Referring to FIG. 2, individual antenna elements 201, 203, 205, 207 for the adaptive antenna array 103 are shown.

Figure 3:
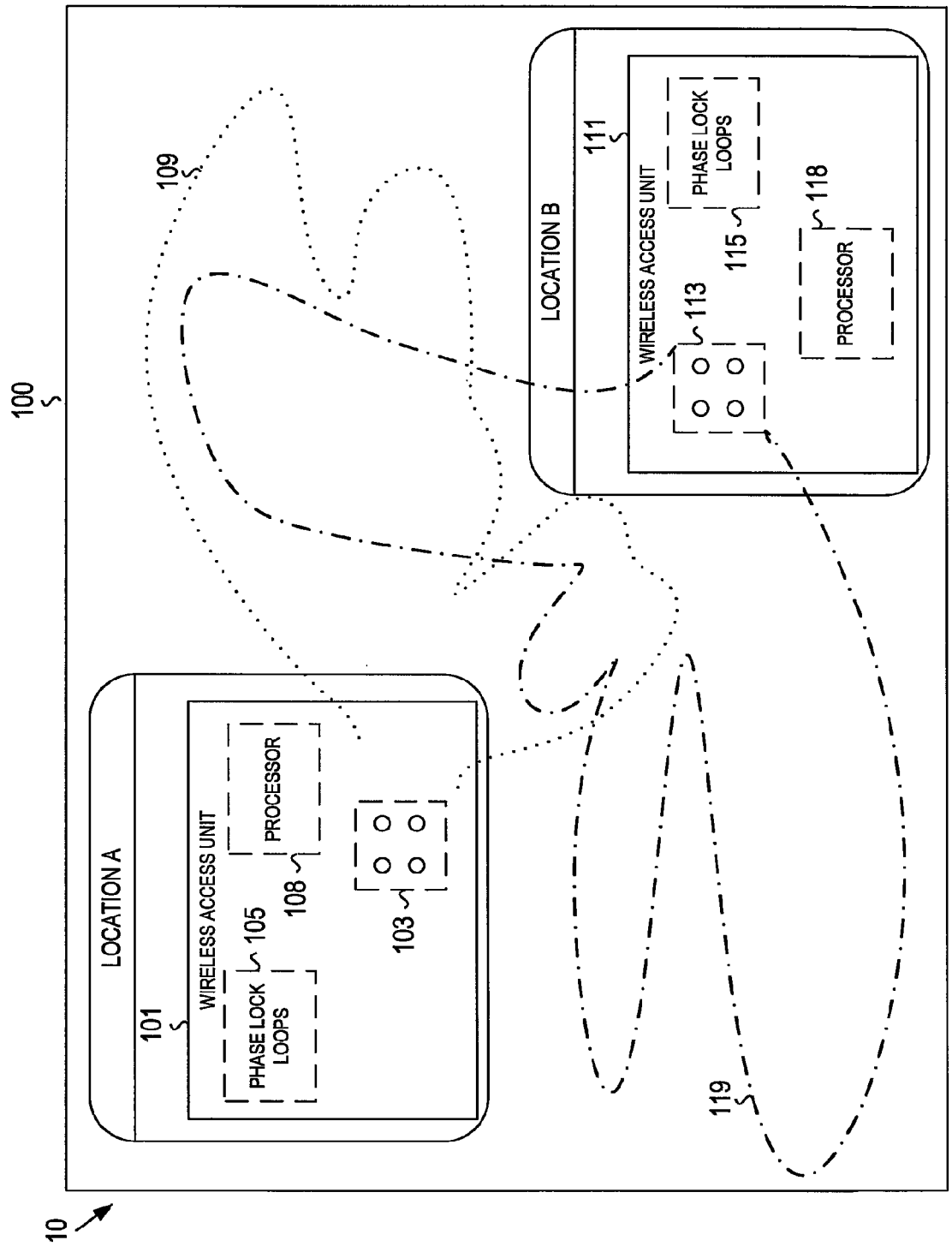
FIG. 3 is a system diagram in accordance with the adaptive antenna array system of FIG. 1 showing radiation patterns.

In FIG. 3, exemplary radiation patterns 109, 119 for the adaptive arrays 103, 113 are shown radiating from their respective wireless access units 101, 111. The radiation patterns 109,119 of the wireless access units 101, 111 or antenna arrays represent the spatial distribution of radiation or coverage area for that device. In the example of FIG. 3, the radiation patterns 109, 119 overlap in their coverage area.

Figure 6:
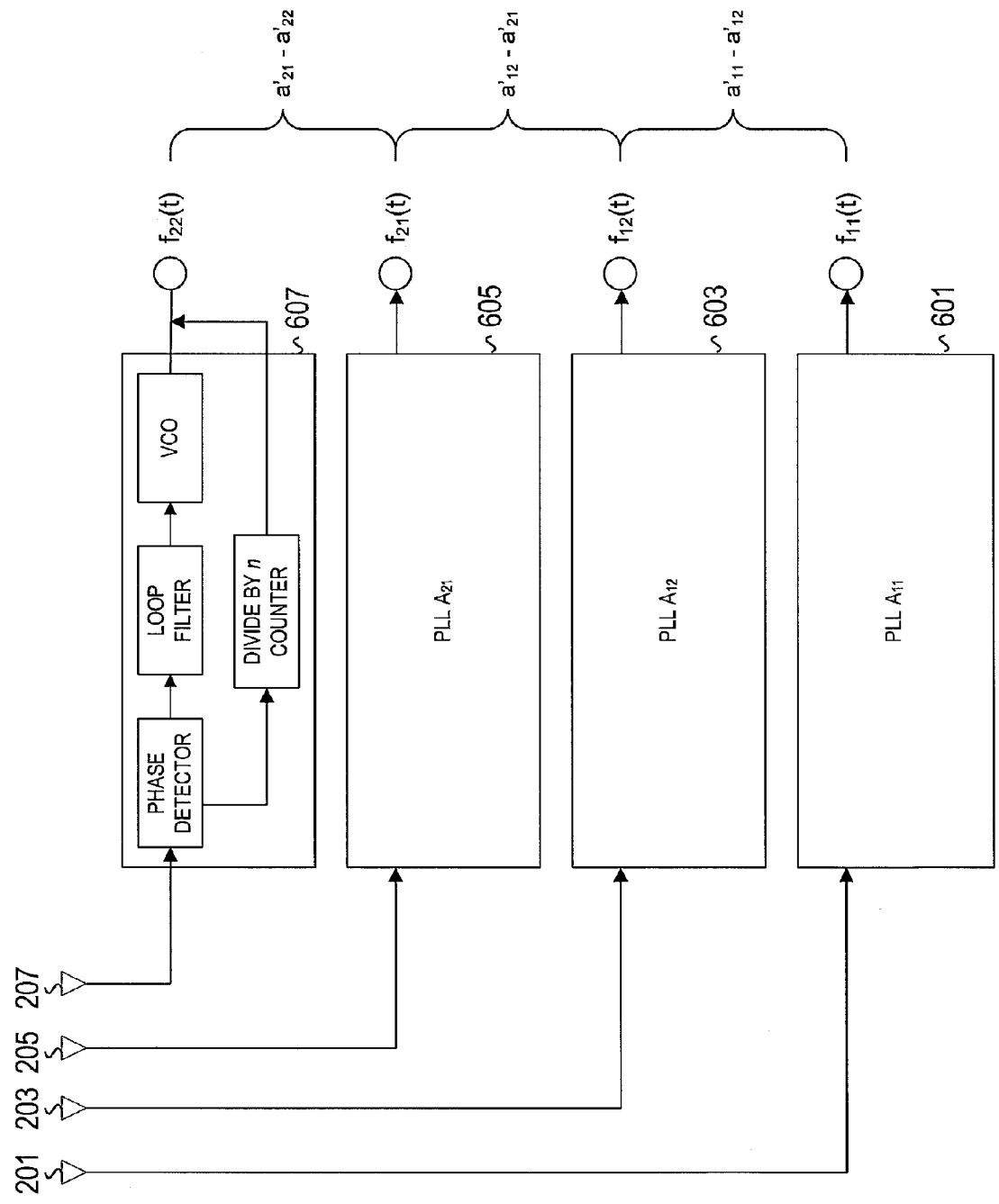
FIG. 6 is a diagram of an array of phase locked loop components associated with an adaptive array according to one embodiment.

Each wireless access unit 101, 111 includes one or more phase lock loops 105, 115, respectively. FIG. 6 illustrates an embodiment in which individual phase lock loops are associated with the adaptive array 103 in the wireless access unit 101. In this embodiment, phase lock loops 601, 603, 605, 607 are associated with antenna elements 201, 203, 205, 207, respectively. Each phase lock loop 601, 603, 605, 607 tracks the phase of the signal received from one or more other wireless access units in the adaptive antenna array system 10. Phase lock loops and their circuitry are generally known in the art, and a detailed discussion thereof is omitted here for convenience only and should not be considered limiting. In view of the present disclosure, those skilled in the art will appreciate that the phase lock loops 601, 603, 605, 607 allow each wireless access unit 101, 111 to generate a signal that has a fixed relationship to the phase of the reference signal received from other wireless access units.

Each wireless access unit 101, 111 also includes a processor component 108, 118, respectively. As explained below, each adaptive antenna array 103, 113 is associated with a plurality of weighting factors. By varying these weighting factors, an adaptive antenna array can modify its radiation pattern. The processor component 108, 118 in the wireless access units 101, 111 computes, adjusts and optimizes the weighting factors based on signals received from other wireless units in the area.

The individual antenna elements (e.g., the antenna elements 201, 203, 205, 207 in FIG. 2) in the adaptive arrays 103, 113 are associated with a weighting factor. In the present disclosure, embodiments are described with the weighting factors arranged in a matrix configuration; however, those skilled in the art will appreciate that other, non-matrix configurations are possible as well. The weighting factors are based on the amplitude and phase of the individual antenna elements in an adaptive array. Accordingly, the group of weighting factors or weighting factor matrix for any particular adaptive antenna array 103, 113 has the same configuration as the individual antenna elements in the respective antenna arrays 103, 113. For example, if the antenna elements are arranged in a 2×3 configuration, the weighting factor matrix will be in the form of a 2×3 matrix. In the embodiment of FIG. 2, the weighting factors in matrix 209 are associated with the individual antenna elements 201, 203, 205, 207.

The weighting factors for each antenna element and thus the weighting factor matrix for the antenna arrays 103, 113 can be determined based on calculations, although heuristic approaches in which weighting factors are set and the radiation field measured by test devices (e.g., units which log onto the network through the access points) may be more appropriate. In one embodiment, each wireless access unit 101, 111 maintains an aggregate weight matrix describing the weighting factors for its own antenna elements, as well as the antenna elements of the other adaptive arrays operating in the area.

Those skilled in the art will recognize that the weighting factor matrix for an adaptive array determines the radiation pattern for the respective wireless access unit. The amplitude and phase components of the antenna elements are based on an electrical excitation signal. By adjusting the amplitude and phase components of each individual antenna element within the wireless access unit, the weighting factor matrix, and thus, the radiation pattern of the unit may be customized. The antenna weighting factor may be optimized to reduce spurious radiation (e.g., radiation transmitted in unwanted directions) and increase the directivity of the antenna. This is accomplished by exciting each of the antenna elements with different voltages. The antenna elements may be fed using a variety of feeding techniques generally known in the art (e.g., microstrip line feed, probe feed, aperture-coupled feed, and proximity-coupled feed, etc.), which provides a path for an electrical signal to excite the antenna elements. In addition, the size and shape of each antenna element determines the operating frequency of the antenna element, although the antenna element is not limited to one particular frequency band. The adaptive arrays 103, 113 may operate in any frequency band where a wireless access unit is capable of communicating with other wireless access units. In one embodiment, the wireless access units 101, 111 operate in the ultra high frequency range (UHF). The UHF range has a frequency range between 300 MHz and 3 GHz. In another embodiment, the wireless access units 101, 111 operate in the super high frequency (SHF) range. The SHF range has a frequency range between 3 GHz and 30 GHz.

Figure 8:
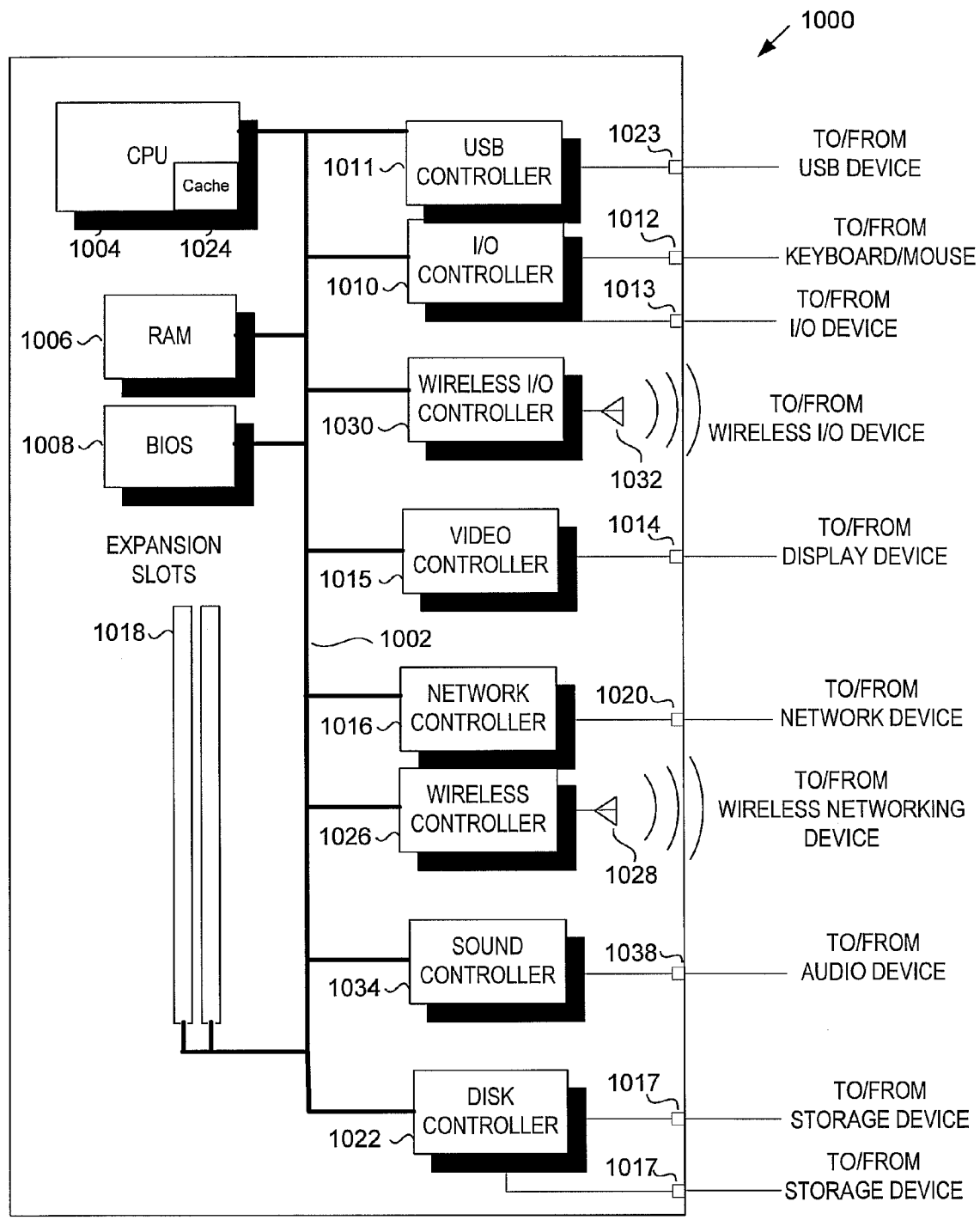
FIG. 8 is a block diagram of a computer system through which the embodiments of the present disclosure may be implemented.

FIG. 8 is a block diagram of a computer architecture or system 1000 through which the embodiments of the multi-unit adaptive antenna array system 10, including the processor components 108, 118, may be realized and/or implemented. A system bus 1002 transports data amongst the Central Processing Unit (CPU) 1004, RAM 1006, the Basic Input Output System (BIOS) 1008 and other components. The CPU 1004 may include a cache memory component 1024. The computer system 1000 may include one or more external storage ports 1017 for accessing a hard disk drive, optical storage drive (e.g., CD-ROM, DVD-ROM, DVD-RW), flash memory, tape device, or other storage device (not shown). The relevant storage device(s) are connected through the external storage port 1017 which is connected to the system bus 1002 via a disk controller 1022. A keyboard and pointing device (e.g. mouse. touch pad) (not shown) can be connected to the keyboard/mouse port(s) 1012, and other I/O devices could be connected to additional I/O port(s) 1013, which are connected to the system bus 1002 through the I/O controller 1010. Additional ports or devices, such as serial ports, parallel ports, firewall adapters, or biometric devices (not shown), may be utilized through the I/O controller 1010. A display device (not shown) can be connected to a display device port 1014 which is connected to the system bus 1002 through the video controller 1015. A network device (not shown), including but not limited to an Ethernet device or other device having networking capability, can be connected to a network port 1020 which is connected through the network controller 1016 to the system bus 1002. The computer system 1000 may be wirelessly connected to a network device that is configured for wireless operation (not shown), including but not limited to wireless routers, using an antenna 1028 connected to a wireless controller 1026 connected to the system bus 1002, where the antenna transmits/receives signals to/from the network device. The computer system 1000 may include one or more USB ports 1023. A USB device (not shown), including but not limited to a printer, scanner, keyboard, mouse, digital camera, storage device, PDA, cellular phone, biometric device, webcam, and I/O adapters can be connected to the USB port 1023 which is connected to the system bus 1002 through the USB controller 1011. Other devices, such as cellular phones, PDAs, and other portable devices may also be connected wirelessly via a wireless I/O antenna 1032 that is connected to a wireless I/O controller 1030. Examples of wireless I/O technologies include, but are not limited to, Bluetooth, Infrared (IR), and Radio-Frequency (RF). Audio devices, such as microphones, speakers, or headphones may be connected to a sound port 1038 that is connected to a sound controller 1034 that is connected to the system bus 1002. Expansion slots 1018 can include Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1000. These slots can be used to connect network cards, video cards, sound cards, modems and any other peripheral devices generally used with a computer. The computer system 1000 also includes a source of power (not shown), including but not limited to a power supply connected to an external source of power, and an internal or external battery. Detailed descriptions of these devices have been omitted for convenience only and should not be construed as limiting.

As discussed and as shown in FIG. 3, each adaptive array 103, 113 produces its own radiation pattern 109, 119, depending on the weighting factor associated with each of the adaptive arrays 103, 113. In the example of FIG. 3, since the radiation patterns 109, 119 overlap in their coverage areas, those skilled in the art will recognize that such overlap may degrade the signals due to impairments such as multipath and co-channel interference. Moreover, it may be desirable to exclude a region of the area from signal coverage. For example, there may be a device that is interfering with the signal in a particular area. To avoid signal degradation and provide enhanced tailoring techniques, each adaptive array can adjust its radiation pattern based on the radiation pattern of other arrays operating in the area.

Figure 5:
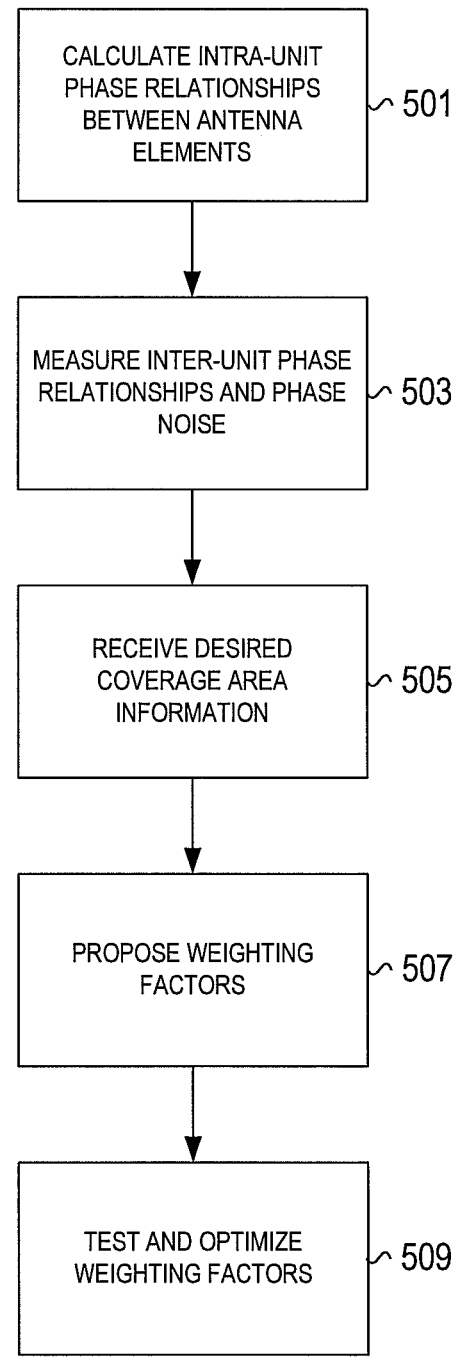
FIG. 5 is a flow diagram illustrating the process of determine weighting factors based on the phase relationships between two or more arrays in the multi-unit adaptive array system.

FIG. 5 shows an embodiment of a weighting process in which the fixed phase relationships between the arrays in the wireless access units are determined, such that tailored coverage patterns may be developed, with the result being a weighting pattern that may be used by a wireless access unit to transmit a signal in conjunction with the other wireless access units operating in the area.

In the first step of the weighting process 501, a wireless access unit calculates the fixed phase relationships between each of its individual antenna elements in its adaptive array (s). This intra-unit phase relationship defines the difference in phase between the signals transmitted by each antenna element. The relationship provides the wireless access unit with an indication of its current radiation pattern. Next, each wireless unit determines the phase relationships and noise associated with the signal of other wireless access units in the system at step 503 (i.e., the inter-phase relationships). The wireless access units track the phase of the signal received from other units via one or more phase lock loops, as previously discussed with respect to FIG. 6. Measurement of the phase noise and drift will indicate the extent to which two individual units can be phase-locked. As noted above, in one embodiment each antenna element has a separate phase lock loop.

Once the intra-phase and inter-phase relationships are known, each access unit adjusts it weighting matrix (i.e., weighting factor) to transmit simultaneously at the same frequency. In one embodiment, the wireless access units go through a periodic process of monitoring their phase relationships with each other before the transmission of data. In the event that those phase relationships change, the aggregate weighting matrix is re-adjusted to maintain the desired radiation pattern.

Figure 7:
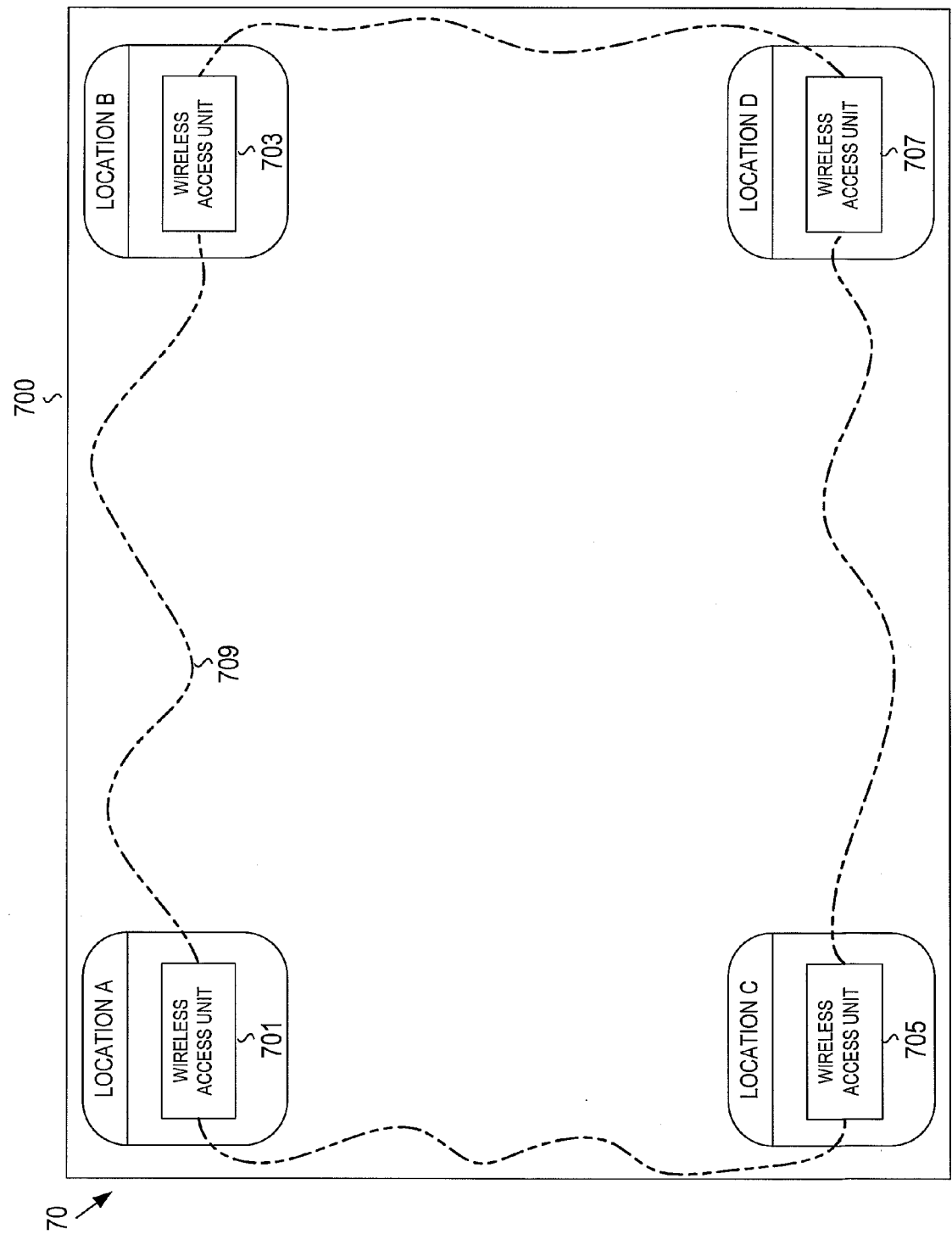
FIG. 7 is a system diagram of a multi-unit adaptive antenna array system according to one embodiment where a coverage area is defined by the location of four arrays.

In step 505, the wireless access unit receives an indication of the desired coverage area. The desired coverage area may be input by a user (not shown) of one or more of the wireless units. For example, a user may input coordinates into a user interface. Alternatively, the system may discover a source of signal degradation and automatically modify the coverage area. In one embodiment, degradation is detected by a single wireless access unit. When that single unit modifies the phase of its signal, the other units in the system detect the change and lock onto the new phase. Also, the coverage area may be defined by the configuration of the wireless access units. In one example, illustrated in FIG. 7, a desired coverage area 700 for an adaptive array system 70 is defined by the location of four wireless access units 701, 703, 705, 707. In this example, the coverage area 700 is generally designated as a rectangular area with a wireless access unit approximately in each corner.

Still referring to FIG. 5, after coverage information is provided to a wireless access unit, the unit may then propose a set or matrix of weighting factors at step 507. Since each individual weighting factor is associated with an antenna element in the wireless unit, the revised weighting factor matrix collectively defines a new radiation pattern for the unit. The wireless access unit determines these weighting factors through calculations in processing component (e.g., processors 108, 118). Once the proposed weighting factors have been determined, the radiation pattern is tested and the weighting factors are adjusted as required to obtain the desired coverage area at step 509. This process may be repeated until the desired coverage area is obtained.

In one embodiment, an iterative algorithm is used to determine the weighting factors. Examples of suitable iterative algorithms include, without limitation, the Conjugate Gradient Method, the Constant Modulus Algorithm (CMA), the Least Mean Squares (LMS) algorithm, the Recursive Least Squares (RLS) algorithm, and the Sample Matrix Inversion (SMI) algorithm. Note that these algorithms each require the availability of a reference signal which is correlated with the desired signal. Other embodiments do not require any reference signal information. For these embodiments, a blind adaptive algorithm such the Constant Modulus Algorithm (CMA) or the Cyclostationary algorithm may be used to determine the weighting factors.

Figure 4:
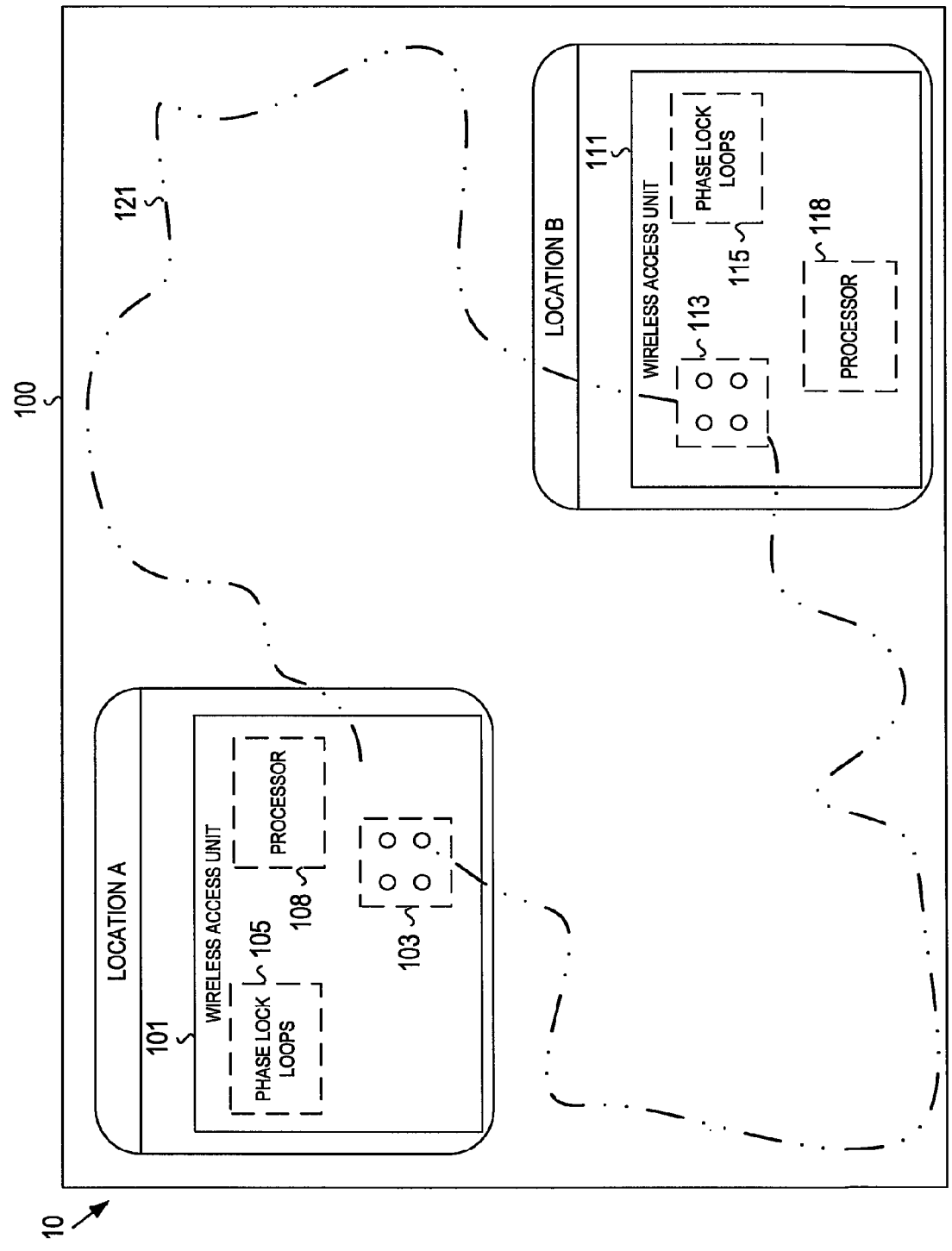
FIG. 4 is a system diagram of a multi-unit adaptive antenna array system according to one embodiment where a tailored radiation pattern is illustrated.

As shown in FIG. 4, if the adaptive arrays 103, 113 provide coverage cooperatively, the net effect is a highly tailored radiation pattern 121. Rather than transmitting radiation patterns 109, 119 that overlap or conflict (as shown in FIG. 1), the weighting factors for each array 103, 113 are adjusted to in effect collectively transmit a single radiation pattern 121. Similarly, in the example of FIG. 7, the wireless access units 701, 703, 705, 707 operate in conjunction as described herein to provide a radiation pattern 709 that produces a coverage area that approximates the desired coverage area 700.

The embodiments of the present disclosure may be implemented with any combination of hardware and software. If implemented as a computer-implemented apparatus, the embodiments of the present disclosure are implemented using means for performing all of the steps and functions described above.

The embodiments of the present disclosure can be included in an article of manufacture (e.g., one or more computer program products) having, for instance, computer useable media. The media has embodied therein, for instance, computer readable program code means for providing and facilitating the mechanisms of the present disclosure. The article of manufacture can be included as part of a computer system or sold separately.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of adjusting a plurality of weighting factors associated with a first access unit located at a first geographic location to collectively produce a collective radiation pattern over a defined geographic coverage area with a plurality of second access units, wherein each second access unit is located at a second geographic location distinct from the first geographic location, the method comprising:

receiving, by the first access unit, user input of location coordinates defining the geographic coverage area;

identifying, by the first access unit, the plurality of second access units based on the defined geographic coverage area;

tracking, by the first access unit, a signal received from each of the second access units using a plurality of phase lock loops, wherein each phase lock loop is associated with an antenna element within the first access unit;

determining, by the first access unit, a phase relationship between the first access unit and each second access unit based on the tracked signals;

generating, by the first access unit, a plurality of weighting factors that produce a first portion of the collective radiation pattern based on the determined phase relationships, wherein each first weighting factor is associated with one of the plurality of antenna elements;

detecting, by the first access unit, that the first portion of the collective radiation pattern conflicts with a second portion of the collective radiation pattern produced by one of the second access units; and adjusting, by the first access unit, the plurality of weighting factors based on the phase relationship, wherein the adjusted weighting factors produce a modified first portion of the collective radiation pattern that does not conflict with the second portion of the collective radiation pattern.

2. The method of claim 1, further comprising:

periodically monitoring the phase relationship between the access unit and the at least one other access unit;

determining that the phase relationship has changed; and adjusting the plurality of weighting factors based on the changed phase relationship.

3. The method of claim 1, wherein the access unit is mobile and the at least one other access unit is stationary.

4. The method of claim 1, wherein the plurality of weighting factors are adjusted using an iterative method selected from a group comprising: Conjugate Gradient Method, Constant Modulus Algorithm, Least Mean Squares Algorithm, Recursive Least Squares Algorithm, and Sample Matrix Inversion Algorithm.

5. The method of claim 1, further comprising:

detecting, by the first access unit, a source of signal degradation in the defined geographic coverage area; and modifying, by the first access unit, the defined geographic coverage area based on the detected source of signal degradation to create a modified geographic coverage area.

6. The method of claim 5, further comprising:

generating, by the first access unit, a plurality of new weighting factors that produce a portion of a new collective radiation pattern over the modified geographic coverage area.

7. The method of claim 1, wherein the modified geographic coverage area excludes a region of the defined coverage area associated with the source of signal degradation.

8. The method of claim 1, wherein each of the plurality of weighing factors is associated with a respective one of the plurality of antenna elements and wherein the plurality of weighting factors are arranged in the same configuration as the plurality of antenna elements.

* * * * *